United States Patent [19]
Wise

[11] 3,991,506
[45] Nov. 16, 1976

[54] FISHING LINE FLOAT

[76] Inventor: Wayne T. Wise, Box 175, Frankfort, S. Dak. 57440

[22] Filed: July 25, 1975

[21] Appl. No.: 598,764

[52] U.S. Cl. .............................................. 43/44.88
[51] Int. Cl.² ...................................... A01K 93/00
[58] Field of Search ............. 43/44.88, 44.87, 44.91

[56] References Cited
UNITED STATES PATENTS

| 2,077,184 | 4/1937 | Rader et al. | 43/44.87 |
| 2,908,991 | 10/1959 | Cummings et al. | 43/44.88 |

Primary Examiner—Louis G. Mancene
Assistant Examiner—Daniel J. Leach
Attorney, Agent, or Firm—Merchant, Gould, Smith, Edell, Welter & Schmidt

[57] ABSTRACT

A fishing line float is provided with a spherical body having a tapered slot therein for engaging a fishing line and holding the float in a desired position along the fishing line. When the fishing line is retrieved, the float strikes the tip of the fishing rod and disengages the line from the tapered slot to facilitate continued retrieval of the fishing line. A line restraining catch is provided on the float to prevent loss thereof when the line is disengaged from the tapered slot.

6 Claims, 5 Drawing Figures

U.S. Patent
Nov. 16, 1976
3,991,506
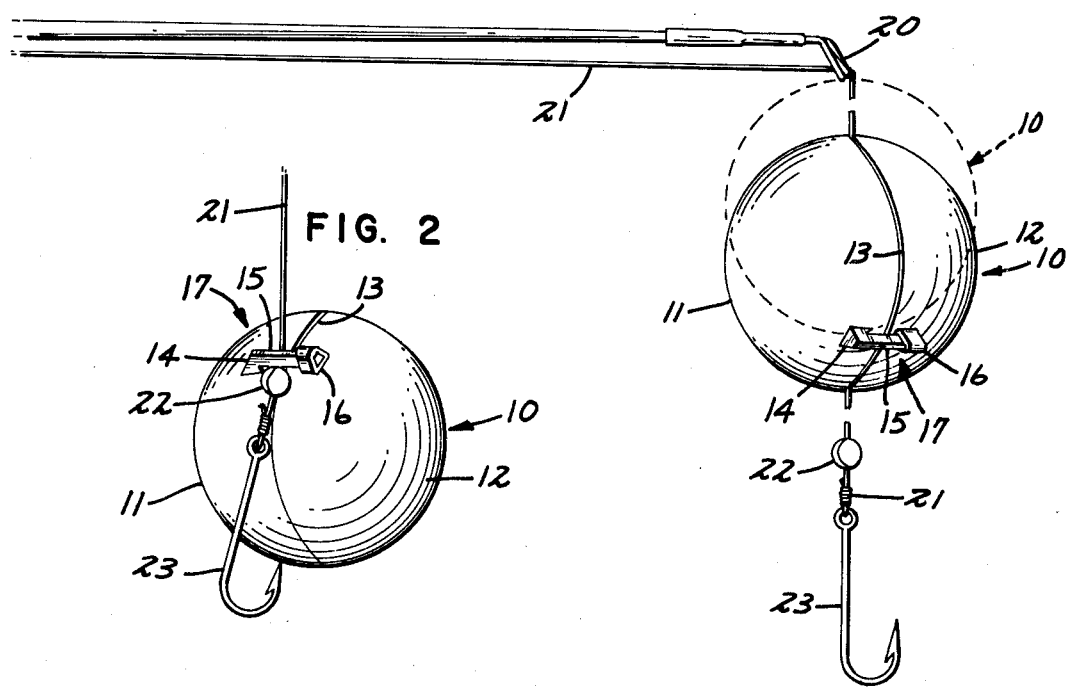
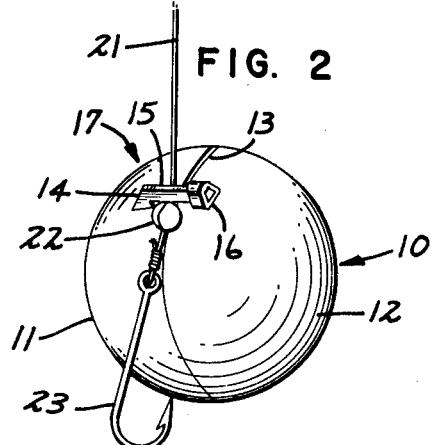
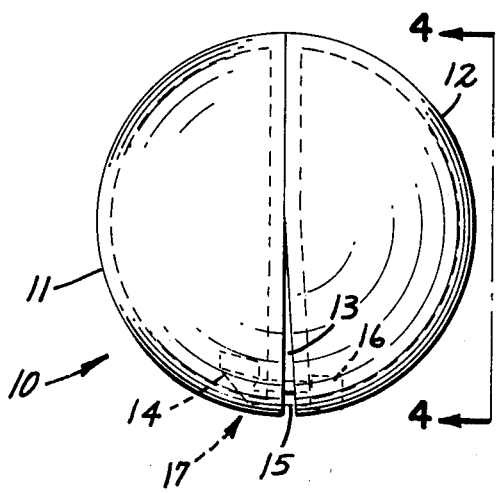
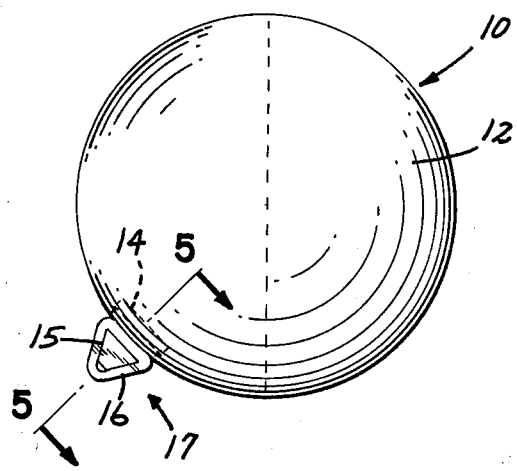
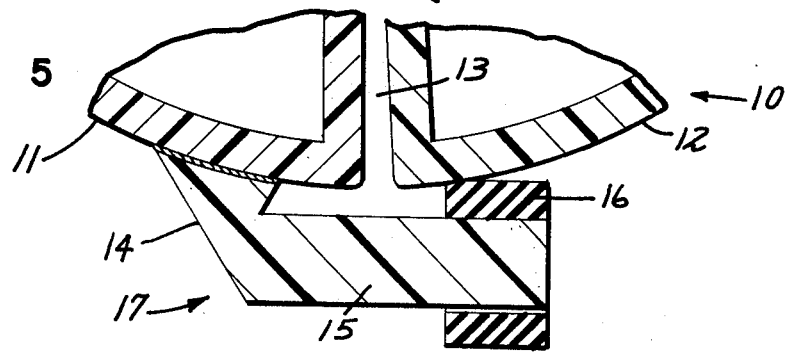

FISHING LINE FLOAT

BACKGROUND OF THE INVENTION

1. Field of the Invention:

The present invention generally concerns a float device, and more specifically concerns a fishing line float through which fishing line is completely retrievable.

2. Prior Art:

Fishing line floats have been developed in a variety of forms since the early anglers attached cork floats to their fishing line to provide a means of visually observing the subsurface activity on their line. Today, the most common type of fishing float is not significantly different from the early cork floats. The most common modern float is a simple hollow plastic ball with a spring-biased line catch which immovably secures the float to any given position along the line. In order to readjust the position of this type of float, it is necessary to manually disengage the catch before the float can be moved along the line. There are, however, other types of modern fishing floats which are more sophisticated. For example, a number of floats have been designed to include a variety of complicated internal structures which will automatically pay out a certain amount of line when the float is cast into the water. The internal mechanisms of these floats vary from complicated pairs of inertial fly wheels to simple line spools. Examples of the various types of structures are found in U.S. Pat. Nos. 1,973,028, issued to Thomas on Sept. 11, 1934; 2,646,643, issued to Nordlund on July 28, 1958; 2,669,054, issued to Smith, Sr. on Feb. 16, 1954; 2,720,720, issued to Landrum on Oct. 18, 1955; 3,057,107, issued to Finnicum on Oct. 9, 1962; 3,084,468, issued to Christophel on Apr. 9, 1963; 3,141,256, issued to McBriar on July 21, 1964; 3,364,613, issued to Sewell on Jan. 23, 1968; 3,464,141, issued to Amlin on Sept. 2, 1969; and 3,673,729, issued to Lintz on July 4, 1972.

Standard floats are all subject to a common problem. When the fishing line is reeled in, or retracted, the float is drawn toward the fishing rod and will eventually contact the rod tip. In the most common type of float it is extremely difficult, if not impossible, for the fisherman to reel the line in any farther once the float contacts the rod tip. This results in difficulty in landing a catch especially in those cases where the hook was set deep, that is, where the distance between the float and the hook is several feet or more. Further, if the fisherman must stop to adjust or remove the float, the all too frequent result is loss of the catch.

Several floats have been designed to help alleviate this type of problem. For example, in Sewell, U.S. Pat. No. 3,364,613, a float is provided with a double internal reel such that when the line is retracted to the fishing rod, the line is also retracted onto the internal reel of the float. Hence, when the line is fully retracted onto the fishing reel the line between the float and the hook is also retracted onto the internal float reel thereby making it much easier to land the catch. Although this type of float is an improvement over the standard float, it may not be satisfactory in all circumstances. For example, this type of float may be relatively heavy and therefore sit too low in the water. In such a condition it may not be as responsive to the subtle movement of the fishing line. A further problem with this type of float is that it is subject to fouling or failure of the relatively complex internal structures.

Therefore, a need exists for a relatively simple and reliable float which permits complete retrieval of the line without manual adjustments or complex internal structures.

SUMMARY

The present invention achieves the need for a simple float which permits complete retrieval of the fishing line. The float of the present invention utilizes a tapered slot through approximately one-half of the circumferential distance of the spherical body. The dimensions of the slot are such that a standard fishing line is readily insertable into the float at the surface thereof and becomes frictionally retained toward the center of the float. The frictional fit of the line into the tapered slot of the float is sufficient to hold the sinker and fishing hook during normal fishing operations, but will also permit release of the line when pressure is applied thereto. A line restraining catch is also provided on the float to prevent loss of the float when the line is disengaged from the tapered slot.

BRIEF DESCRIPTION OF THE DRAWINGS

FIG. 1 is an elevational view of the present invention showing its cooperation with a fishing line and pole;

FIG. 2 is an elevational view of the present invention showing the cooperation of the present invention and a fishing line in a retracted position;

FIG. 3 is a top plan view of the present invention;

FIG. 4 is an elevational view taken along line 4—4 of FIG. 3; and

FIG. 5 is an enlarged view, partly in section, taken along line 5—5 of FIG. 4.

DETAILED DESCRIPTION OF THE DRAWINGS

The float of the present invention is described generally by a spherical body 10 of FIG. 1. Body 10 is formed by two hemispherical lobes 11 and 12. In the preferred form, the float is constructed of plastic such that hemisphere 11 and hemisphere 12 would be formed independently and then bonded together. Hemispheres 11 and 12 are hollow to provide a lighter structure. The interface of hemisphere 11 and hemisphere 12 is such that when the two are bonded together a narrow tapered slot 13 if formed therein. The narrow slot provides the means by which the float is attached to a fishing line. When the line engages the narrower tapered portion of the slot, it is frictionally retained between the two hemispheres until a pressure is applied to the line.

Slot 13 can be formed by providing a beveled surface on either or both of the interface surfaces of hemispheres 11 and 12. For example, if a ten degree surface opening of the slot was desired it could be provided in several ways. On way to accomplish this would be to bevel the interface surfaces of each of the hemispheres from a point in the approximate center of each interface surface along a radial line by 5 degrees. Thereafter, when assembled, the slot 13 extends across approximately one-half of the circumferential distance of the assembled spherical body 10 and would open to a maximum width of ten degrees. This could also be accomplished by beveling the interface surface of only one of the hemispheres from the center thereof along a radial line by ten degrees. The angular measurement of 10 degrees is used by way of example only and can be varied as a function of the type and diameter of fishing line to be used. That is, the dimensions of the tapered slot must be such that a standard fishing line is readily insertable at the surface of the slot and which becomes frictionally retained near the center of the float in the narrower portion of the slot.

The float is provided with a line restraining catch 17 which extends from hemisphere 11 across slot 13 to hemisphere 12 and is positioned near the lower end of slot 13. Line restraining catch 17 is bonded to the surface of hemisphere 11 along one end 14 of the restraining catch and includes an arm 15 which extends across slot 13 and which terminates at a position over hemisphere 12. Line restraining catch 17 is provided with an enlarged portion 16 thereof which is in close engagement with the surface of the opposite hemisphere but is not bonded thereto. The space between the surface of the hemisphere and the enlarged portion 16 of catch 17 must be such that a fishing line is insertable therethrough when a slight pressure is applied. The line restraining catch 17 serves to prevent the float from falling off of the fishing line 21 when the fishing line is released from the frictional engagement with tapered slot 13.

The enlarged portion 16 of line restraining catch 17, as shown in detail in FIG. 5, is a flexible material, such as a plastic band which is inserted over arm 15 to facilitate insertion of the line between the surface of the hemisphere and the line restraining catch 17. However, it can be formed as an integrally molded part of arm 15.

When the float is attached to the fishing line, the user selects a desired position along the fishing line and forces the fishing line under the enlarged portion 16 of line restraining catch 17. The line is then inserted into slot 13 and is pulled toward the center of the spherical body 10 until it is securely retained in the slot. Thereafter, the frictional fit of the fishing line in the slot will be sufficient to support a sinker 22 and fish hook 23 as they are suspended at a desired depth beneath the float.

When the line 21 is retracted, the float will be drawn toward the fishing rod and will maintain its preset position along the fishing line. When the float engages or strikes the fishing rod tip 20, the fishing line 21 will be stripped from the tapered slot 13. That is, when the float strikes the rod tip there is an initial resistance which is overcome by continued retrieval of the fishing line. The float rotates toward the rod tip and the line is progressively stripped from the tapered slot until the restraining catch strikes the rod tip. At this time, the line is entirely free from the frictional resistance of the tapered slot. The fishing line is still looped around the line restraining catch 17 thus preventing the float from falling completely off the line while the line is completely retrieved.

The fishing line float of the present invention provides a very simple device which is easily snapped into position on the fishing line and which automatically releases from the fishing line to facilitate complete retrieval of the line without any further manipulation by the fisherman or utilizing complicated internal structures.

It will be apparent that various changes and modifications in the illustrative embodiments of the present invention, shown and described herein, can be made without departing from the scope of the invention as defined in the appended claims.

What is claimed is:

1. An automatically releasable fishing line float, comprising:
   a. a lightweight body formed of material providing a substantially smooth and non-deformable surface having at least one convex curved surface portion with a slot therein which is releasably engageable with a fishing line; and
   b. means extending across said slot for retaining said float on said line when said line is disengaged from said slot.

2. An automatically releasable fishing line float, comprising:
   a. a lightweight body formed of a substantially smooth and non-deformable material having at least one convex curved surface portion with a tapered slot therein such that a fishing line is readily insertable into said slot and becomes frictionally retained as it approaches the center of said float body; and
   b. a line restraining catch, said catch being secured to said body and having an arm portion thereof which extends across said tapered slot and terminates in close proximity with the surface of the body opposite said slot.

3. The fishing line float of claim 2 in which said float body is spherical in shape.

4. A fishing line float, comprising:
   a. a spherical float formed by two hemispherical bodies in which a beveled interface surface is formed between both of said hemispherical bodies such that when said bodies are joined together, a tapered slot is formed therebetween, the angular dimension of said tapered slot is such that a fishing line is readily insertable into said slot and which becomes frictionally retained near the center of said float; and
   b. a line restraining catch, said catch being secured to said body and having an arm portion thereof which extends across said tapered slot and terminates at an enlarged portion thereof which is in close proximity with the surface of said body opposite said slot, said enlarged portion of said arm providing a resistance to insertion of a fishing line thereunder.

5. The fishing line float of claim 4 in which only one of said interface surfaces is beveled.

6. A method of fishing with a pole, fishing line and fishing line float in which said float is a lightweight body having at least one convex curved surface portion with a slot therein which is releasably engageable with the fishing line and including arm means extending across said slot for retaining said float on said line when said line is disengaged from said slot, comprising the steps of:
   a. inserting the fishing line beneath said arm means and into said slot on said float until said line is frictionally retained in said slot such that said float will maintain a set position along said fishing line;
   b. casting said fishing line into the water with said float attached thereto; and
   c. retrieving said fishing line onto said pole through a tip portion thereof until said attached float strikes said tip portion of said pole, and continuing to retrieve said line onto said pole such that said float is caused to rotate beneath said tip portion along said slot until said line is stripped from frictional engagement with said slot and said float is freely suspended from said arm means.

* * * * *

UNITED STATES PATENT OFFICE
CERTIFICATE OF CORRECTION

Patent No. 3,661,506          Dated May 9, 1972

Inventor(s) LUCIUS D. WATKINS

It is certified that error appears in the above-identified patent and that said Letters Patent are hereby corrected as shown below:

IN THE SPECIFICATION:

Col. 1, l. 47 - "animals" should be --luminous--;

Col. 1, l. 49 - "materials" should be --animals--;

Col. 2, l. 19 - "electrostatic" should be --than--;

Col. 3, l. 23 - comma (,) should be a dash (-).

IN THE CLAIMS:

Col. 6, l. 24 - (-C C-) in Claim 1 should be (-C=C-).

Signed and sealed this 29th day of August 1972.

(SEAL)
Attest:

EDWARD M. FLETCHER, JR.
Attesting Officer

ROBERT GOTTSCHALK
Commissioner of Patents